United States Patent Office 3,127,402
Patented Mar. 31, 1964

3,127,402
7-OXOPTERIDINE DERIVATIVES
Irwin J. Pachter, Erdenheim, and Joseph Weinstock, Phoenixville, Pa., assignors to Smith Kline & French Laboratories, Philadelphia, Pa., a corporation of Pennsylvania
No Drawing. Filed Mar. 23, 1962, Ser. No. 182,104
7 Claims. (Cl. 260—251.5)

This invention relates to new 7-oxopteridine derivatives having pharmacodynamic activity, in particular diuretic and hypotensive activity. In addition certain of the compounds of this invention are useful as intermediates in the preparation of other diuretic agents.

The pteridine derivatives of this invention are represented by the following structural formula:

*Formula I*

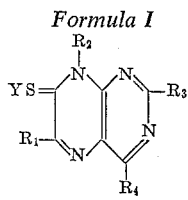

in which:

Y represents O or NH;
$R_1$ represents lower alkyl, phenyl, thienyl or benzyl;
$R_2$ represents lower alkyl, phenyl or phenyl-lower alkylene;
$R_3$ represents amino, lower alkylamino, di-lower alkylamino, phenyl, thienyl, hydrogen or lower alkyl; and
$R_4$ represents amino, lower alkylamino, di-lower alkylamino or methylthio.

The phenyl moieties of $R_1$, $R_2$ and $R_3$ are optionally substituted by inert substituents such as halogen, lower alkyl, lower alkoxy or trifluoromethyl.

The preferred compounds of this invention are those of Formula I in which $R_1$ is methyl, ethyl, phenyl or benzyl; $R_2$ is methyl, ethyl or benzyl; $R_3$ is amino or phenyl and $R_4$ is amino, methylamino or dimethylamino.

Advantageous compounds of this invention are those of Formula I in which Y is NH.

The terms "lower alkyl" and "lower alkoxy" where used herein and in the claims denote moieties having from 1–6, preferably 1–3, carbon atoms. The term "lower alkylene" where used herein denotes moieties having 1–4 carbon atoms.

Also included in this invention are the nontoxic, pharmaceutically acceptable, acid addition salts of the pteridine derivatives of Formula I, such as the salts derived from acetic, hydrochloric, sulfuric, maleic, succinic, phosphoric, or ethanedisulfonic acids. These salts are prepared by dissolving the base in a suitable organic solvent with the acid or in an aqueous acid solution then isolating the salt by filtration, precipitation or evaporation.

The 7-oxo-8-alkyl and -8-phenyl-lower alkylene-pteridines of this invention are prepared by reacting a 7-hydroxypteridine with an alkylating agent according to the following procedure:

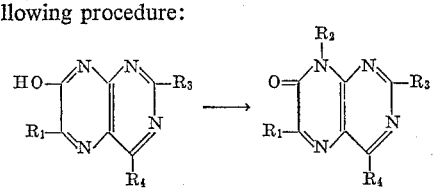

The terms $R_1$ and $R_3$—$R_4$ are as defined above and $R_2$ is lower alkyl or phenyl-lower alkylene.

The 7-hydroxypteridine starting materials are treated with the appropriate alkylating agent such as dimethylsulfate, a lower alkyl halide or a phenyl-lower alkylene halide, such as benzyl or phenethyl halide, in basic solution, for example in aqueous sodium or potassium hydroxide or lower alkoxide. The reaction is carried out at about 25 to 100° C. for from about 5 to 90 minutes.

The 7-hydroxy starting materials are prepared by condensing a 4,5,6-triaminopyrimidine with a glyoxylic acid or ester as follows:

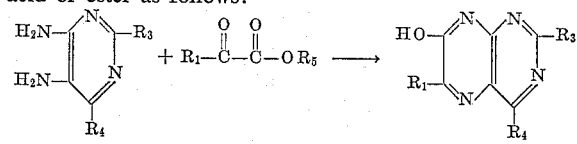

The terms $R_1$ and $R_3$—$R_4$ are as defined above. $R_5$ is hydrogen or lower alkyl.

According to this procedure the 4,5,6-triaminopyrimidine is condensed with a molar equivalent of a substituted glyoxylic acid or ester by heating in an aqueous solution preferably in the presence of sodium acetate for about 1–4 hours. Cooling and filtering yields the 7-hydroxypteridine starting material.

The 4,5,6-triamino-pyrimidine starting materials are either known to the art or are prepared by reduction of the corresponding 5-nitroso compounds as disclosed in U.S. Patent 2,975,180 by means of chemical reducing agents or by catalytic hydrogenation.

Alternatively the compounds of this invention including the 7-oxo-8-phenylpteridines are prepared as follows:

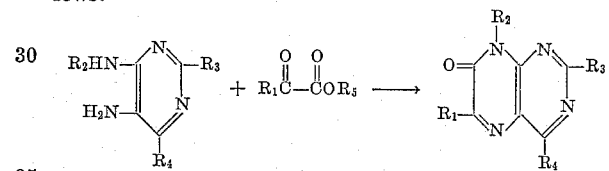

The terms $R_1$–$R_5$ are as defined hereabove. According to the above procedure a 6-substituted aminopyrimidine is reacted with a substituted glyoxylic acid or ester by heating in aqueous solution preferably in the presence of sodium acetate for about 1–4 hours to give, after cooling and filtering, the desired 7-oxopteridine. Since it is possible for the cyclization to proceed in either of two directions when $R_4$ is an active amino moiety it is preferable that $R_4$ be an unreactive moiety such as di-lower alkylamino or methylthio. Where $R_4$ is methylthio the resulting 7-oxo-4-methylthiopteridine may be converted to the corresponding 4-aminopteridine by treating with ammonia or a lower alkylamine in aqueous or lower alkanol solution.

The 7-iminopteridines of this invention are prepared as follows:

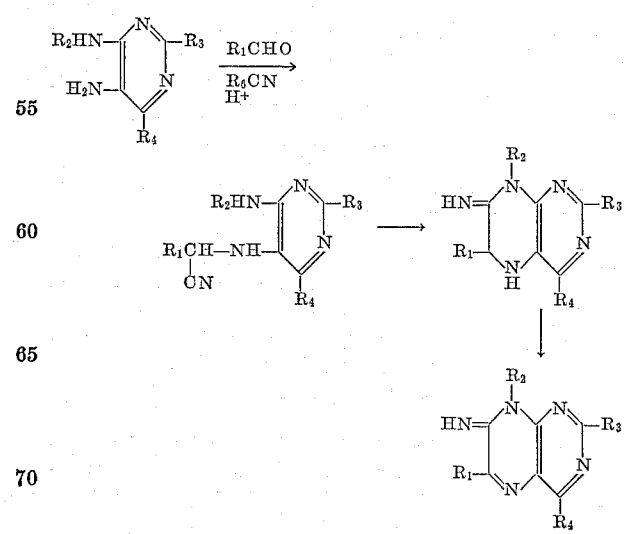

The terms $R_1$–$R_4$ are as defined in Formula I. $R_6$ is hydrogen or alkali metal such as sodium or potassium.

According to the above procedure a 4,5,6-triaminopyrimidine is reacted with at least one molar equivalent of the carbonyl compound, $R_1$CHO, in which $R_1$ is as defined hereabove, in an inert solvent such as a lower alkanol for example ethanol or methanol. The reaction mixture is preferably heated at about 45–90° C. for about 3–15 minutes. The intermediate Schiff base is treated with $R_6$CN in which $R_6$ is as defined hereabove together with an acid such as a dilute mineral acid or preferably a lower alkanoic acid such as acetic acid at about 45–90° C. for about 5–30 minutes. The 4,6-diamino-5-cyanomethylaminopyrimidine intermediate is isolated from the reaction mixture by cooling and filtering.

This cyanomethyl intermediate is treated with an alkali metal lower alkoxide, such as sodium or potassium methoxide or ethoxide, or an alkali metal cyanide, such as sodium or potassium cyanide, in a lower alkanol solution, such as methanol or ethanol, at about 45–85° C. for about 5–10 minutes to give the 7-iminodihydropteridine intermediate. This dihydropteridine is oxidized by air oxidation accomplished by heating in an inert solvent such as phenyl ether or dimethylformamide at about 150–200° C. The 7-imino-8-alkylpteridine of this invention is isolated by cooling and filtering. Alternatively, the dihydropteridine is converted to the pteridine by treating with an oxidizing agent such as potassium ferricyanide, potassium permanganate or aqueous hydrogen peroxide.

Alternatively the 7-iminopteridines of Formula I in which $R_1$ is phenyl are conveniently prepared by the condensation of a 4,6-diamino-5-nitrosopyrimidine with benzyl cyanide in an organic solvent such as dimethylformamide or ethoxyethanol in the presence of an alkali metal alkoxide such as sodium or potassium methoxide. The reaction is carried out at about 50–200° C. conveniently at the reflux temperature of the solvent for about 1–15 minutes. Dilution of the reaction mixture with water and filtration gives the 7-iminopteridines of this invention.

The following examples are not limiting but are illustrative of compounds of this invention and methods for their preparation.

Example 1

A mixture of 25.0 g. of 2,4,5,6-tetraaminopyrimidine hydrosulfite, 45.0 g. of sodium acetate and 12.0 g. of methyl pyruvate in 750 ml. of water is heated at reflux for 2.5 hours. Cooling, filtering and recrystallizing from dimethylformamide gives 2,4-diamino-7-hydroxy-6-methylpteridine.

Fifteen grams of 2,4-diamino-7-hydroxy-6-methylpteridine 80 ml. of 40% aqueous sodium hydroxide is treated with 950 ml. of water. Dimethylsulfate (120 ml.) is added with stirring followed by additional 10% sodium hydroxide solution. The mixture is heated to 75° C. and filtered hot. The crystals obtained are combined with those produced when the filtrate is cooled, treated with water and filtered. Recrystallization from aqueous dimethylformamide gives 2,4-diamino-7,8-dihydro-6,8-dimethyl-7-oxpteridine, M.P. 312–315° C. (dec.).

Example 2

To 8.65 g. of sodium methoxide in 4 l. of ethanol is added 10.0 g. of 2,4-diamino-7-hydroxy-6-methylpteridine. The resulting mixture is heated to 45° C. and treated with 27 ml. of benzyl bromide. After refluxing for five minutes, additional sodium methoxide is added to bring the solution to pH 10. The solution is concentrated in vacuo, treated with water and filtered to give 2,4-diamino-8-benzyl-7,8-dihydro-6-methyl-7-oxopteridine.

Example 3

A mixture of 15 g. of 2,4-diamino-7-hydroxy-6-phenylpteridine and 100 ml. of dimethylsulfate in aqueous sodium hydroxide solution is heated on a steam bath for 10 minutes. Cooling, filtering and recrystallizing the product from aqueous dimethylformamide gives 2,4-diamino-7,8-dihydro-8-methyl-7-oxo-6-phenylpteridine.

Example 4

A mixture of 116 g. of 2-amino-4,6-dichloropyrimidine, 600 ml. of 25% aqueous methylamine and 50 ml. of 10% hydrochloric acid is heated in an autoclave at 150° C. with shaking for 4.5 hours. After evaporating the resulting mixture in vacuo on a steam bath the residue is washed with acetone and treated with water. The solid material is isolated by filtration to give 2-amino-4,6-bis(methylamino)-pyrimidine.

Ten grams of the above prepared pyrimidine is dissolved in 200 ml. of 10% acetic acid and heated at 80° C. Sodium nitrite (5.7 g.) in 10 ml. of water is added dropwise. The resulting mixture is heated for two minutes, then the pH is adjusted to neutral and the solid product is filtered off and recrystallized from water to give 2-amino-4,6-bis(methylamino)-5-nitrosopyrimidine.

To a solution of 6.3 g. of 2-amino-4,6-bis-(methylamino)-5-nitrosopyrimidine in 150 ml. of dimethylformamide is added 4.2 g. of benzyl cyanide and 1.9 g. of sodium methoxide. The resulting mixture is refluxed for two minutes, cooled and diluted with water. The resulting precipitate is collected and recrystallized from aqueous ethanol to give 2-amino-7,8-dihydro-7-imino-8-methyl-4-methylamino-6-phenylpteridine, M.P. 250–251° C.

Example 5

A mixture of 10 g. of 2,4,5-triamino-6-methylaminopyrimidine, 20 ml. of acetaldehyde and 20 ml. of acetic acid is treated with 75 ml. of 95% ethanol and 8.0 g. of potassium cyanide. The mixture is heated on a steam bath for 10 minutes. The precipitate which forms is filtered off to give 2,4-amino-5-($\alpha$-cyanoethylamino)-6-methylaminopyrimidine.

Four grams of the above prepared pyrimidine, 2.5 g. of sodium methoxide and 60 ml. of methanol are heated at reflux for 30 minutes. Cooling and filtering yields 2,4-diamino-7-imino-6,8-dimethyl-5,6,7,8-tetrahydropteridine and 2,7-diamino-6-methyl-4-methylamino-5,6-dihydropteridine which are separated by fractional crystallization.

The 2,4-diamino-7-imino-6,8-dimethyl-5,6,7,8-tetrahydropteridine prepared above is refluxed for 5 minutes in phenyl ether. Cooling and filtering gives 2,4-diamino-7,8-dihydro-7-imino-6,8-dimethylpteridine.

Example 6

To an ethanol solution of 7.5 g. of sodium ethoxide is added 12.0 g. of 2,4-diamino-7-hydroxy-6-phenylpteridine followed by 20 ml. of propyl bromide. The resulting mixture is heated on a steam bath for 10 minutes. Concentrating in vacuo, adding water and filtering gives 2,4-diamino-7,8-dihydro-7-oxo-6-phenyl-8-propylpteridine.

Example 7

By the procedure of Example 6, 2,4-diamino-7-hydroxy-6-phenylpteridine is reacted with phenethyl chloride in ethanol solution containing sodium methoxide to give 2,4-diamino-7,8-dihydro-7-oxo-8-phenethyl-6-phenylpteridine.

Example 8

A mixture of 3.0 g. of 4,5,6-triamino-2-phenylpyrimidine sulfate, 4.5 g. of sodium acetate and 1.7 of ethylglyoxylic acid in 100 ml. of water is refluxed for three hours. After cooling, filtering and recrystallizing from dimethylformamide, 4-amino-6-ethyl-7-hydroxy-2-phenylpteridine is obtained. An aqueous sodium hydroxide solution of the above prepared 7-hydroxypteridine is treated with 25 ml. of ethyl bromide. The resulting mixture is heated on a steam bath. Cooling, treating with water, filtering and recrystallizing from aqueous dimethylformamide gives 4-amino-6,8-diethyl-7,8-dihydro-7-oxo-2-phenylpteridine.

Similarly reacting 4,5,6-triamino-2-phenylpyrimidine sulfate with methyl pyruvate and reacting the resulting 4-amino-7-hydroxy-6-methyl-2-phenylpteridine with dimethylsulfate gives 4-amino-7,8-dihydro-6,8-dimethyl-7-oxo-2-phenylpteridine.

*Example 9*

By the procedure of Example 1, 2,4,5,6-tetraaminopyrimidine hydrosulfite is reacted with benzylglyoxylic acid to give 2,4-diamino-6-benzyl-7-hydroxypteridine. A mixture of this hydroxypteridine with dimethylsulfate in aqueous sodium hydroxide solution is heated to 70–75° C. After working up as in Example 1, 2,4-diamino-6-benzyl-7,8-dihydro-8-methyl-7-oxopteridine is obtained.

*Example 10*

By the procedure of Example 1, 4,5,6-triamino-2-methylaminopyridimidine is condensed with benzylglyoxylic acid to give 4-amino-6-amino-6-benzyl-7-hydroxy-2-methylaminopteridine. Reaction of this hydroxypteridine with excess dimethylsulfate in aqueous sodium hydroxide solution affords 4-amino-6-benzyl-7,8-dihydro-8-methyl-2-methylamino-7-oxopteridine.

Similarly using 4,5,6-triamino-2-dimethylaminopyrimidine there is obtained 4-amino-6-benzyl-7,8-dihydro-8-methyl-2-dimethylamino-7-oxopteridine.

*Example 11*

5,6-Diamino-4-dimethylamino-2-phenylpyrimidine (3.0 g.), prepared by reduction of the corresponding 5-nitrosopyrimidine, is reacted with 1.5 g. of methyl pyruvate in aqueous solution containing 4.5 g. of sodium acetate. After refluxing for three hours, 7-hydroxy-6-methyl-4-dimethylamino-2-phenylpteridine is obtained.

This hydroxypteridine is refluxed with an excess of benzyl bromide in ethanol solution containing sodium methoxide. Working up as in Example 2 gives 8-benzyl-7,8 - dihydro - 6-methyl-4-dimethylamino-7-oxo-2-phenylpteridine.

*Example 12*

A mixture of 3.0 g. of 4,5,6-triamino-2-(2-thienyl)-pyrimidine, prepared by reducing the corresponding 5-nitrosopyrimidine, 1.2 g. of methyl pyruvate, 4.0 g. of sodium acetate and 100 ml. of water is refluxed for two hours to give on cooling and filtering 4-amino-7-hydroxy-6-methyl-2-(2-thienyl)pteridine.

Reaction of the above prepared 7-hydroxypteridine with dimethylsulfate in aqueous sodium hydroxide gives 4 - amino - 7,8-dihydro-6,8-dimethyl-7-oxo-2-(2-thienyl)-pteridine.

*Example 13*

By the procedure of Example 1, 2,4,5,6-tetraaminopyrimidine hydrosulfite is reacted with the ethyl ester of 2-thienylglyoxylic acid in aqueous solution containing sodium acetate. The resulting 2,4-diamino-7-hydroxy-6-(2-thienyl)pteridine is reacted with benzyl bromide in ethanolic sodium methoxide solution to give 2,4-diamino-8-benzyl-7,8-dihydro-7-oxo-6-(2-thienyl)pteridine.

*Example 14*

Ten grams of 5-amino-6-anilino-4-chloropyrimidine is reacted with 50 ml. of 25% aqueous dimethylamine in a bomb at 125° C. for four hours. 5-amino-6-anilino-4-dimethylaminopyrimidine is isolated from the mixture by filtration.

A mixture of 8.5 g. of 5-amino-6-anilino-4-dimethylaminopyrimidine and 10 g. of phenylglyoxylic acid in 100 ml. of water containing 4.0 g. of sodium acetate is heated at reflux for two hours. Cooling and filtering gives 4-dimethylamino-7,8-dihydro-7-oxo-6,8-diphenylpteridine.

*Example 15*

Reaction of 4,5,6-triaminopyrimidine hydrosulfite with excess methyl pyruvate in aqueous solution as in Example 1 gives 4-amino-7-hydroxy-6-methylpteridine.

Heating a mixture of 4-amino-7-hydroxy-6-methylpteridine and excess dimethylsulfate in aqueous sodium hydroxide, then cooling and filtering gives 4-amino-7,8-dihydro-6,8-dimethyl-7-oxopteridine.

Similarly reacting 4,6,5-triamino - 2 - methylpyrimidine with methyl pyruvate and treating the resulting 7-hydroxypteridine with benzyl bromide as in Example 2 gives 4-amino-8-benzyl-7,8-dihydro-2,6-dimethyl-7-oxopteridine.

By a similar procedure starting with 4,6,5-triamino-2-butylpyrimidine, 4-amino-8-benzyl-2-butyl-7,8-dihydro-6-methyl-7-oxopteridine is obtained.

*Example 16*

A mixture of 15.0 g. of 2,5,6-triamino-4-methylthiopyrimidine and 10 g. of phenylglyoxylic acid in aqueous solution containing sodium acetate is refluxed for 2.5 hours to give 2-amino-7-hydroxy-4-methylthio-6-phenylpteridine.

Treating the above prepared hydroxypteridine with dimethylsulfate in aqueous sodium hydroxide at 75° C. and working up as in Example 1 gives 2-amino-7,8-dihydro-8-methyl-4-methylthio-7-oxo-6-phenylpteridine.

What is claimed is:

1. A chemical compound of the formula:

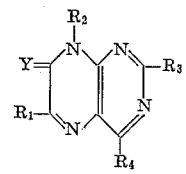

in which:

Y is a member selected from the group consisting of O and NH;

$R_1$ is a member selected from the group consisting of lower alkyl, phenyl, thienyl and benzyl;

$R_2$ is a member selected from the group consisting of lower alkyl, phenyl and phenyl-lower alkylene;

$R_3$ is a member selected from the group consisting of amino, lower alkylamino, di-lower alkylamino, phenyl, thienyl, hydrogen and lower alkyl; and $R_4$ is a member selected from the group consisting of amino, lower alkylamino, di-lower alkylamino and methylthio.

2. A chemical compound of the formula:

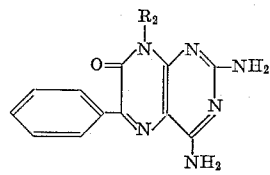

in which $R_2$ is lower alkyl.

3. A chemical compound of the formula:

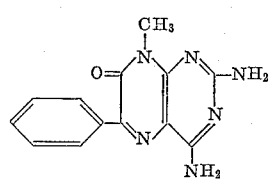

4. A chemical compound of the formula:
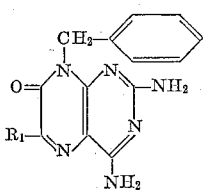
in which $R_1$ is lower alkyl.
5. A chemical compound of the formula:
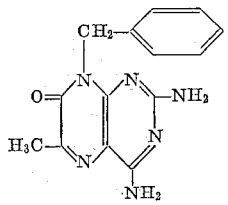
6. A chemical compound of the formula:
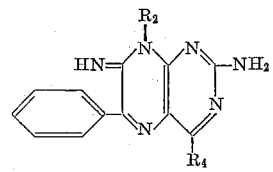
in which $R_2$ is lower alkyl and $R_4$ is lower alkylamino.
7. A chemical compound of the formula:
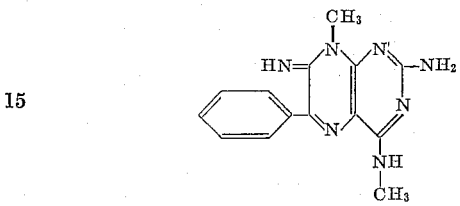
No references cited.